US010582554B2

(12) United States Patent
Iinuma

(10) Patent No.: US 10,582,554 B2
(45) Date of Patent: Mar. 3, 2020

(54) CONNECTION PROCESSING METHOD, COMMUNICATION SYSTEM, AND COMMUNICATION DEVICE

(71) Applicant: FUJITSU CLIENT COMPUTING LIMITED, Kawasaki-shi, Kanagawa (JP)

(72) Inventor: Nobuharu Iinuma, Yokohama (JP)

(73) Assignee: Fujitsu Client Computing Limited (JP)

( * ) Notice: Subject to any disclaimer, the term of this patent is extended or adjusted under 35 U.S.C. 154(b) by 170 days.

(21) Appl. No.: 15/653,859

(22) Filed: Jul. 19, 2017

(65) Prior Publication Data
US 2018/0042061 A1 Feb. 8, 2018

(30) Foreign Application Priority Data

Aug. 4, 2016 (JP) .................................. 2016-153450

(51) Int. Cl.
*H04W 4/80* (2018.01)
*H04W 76/14* (2018.01)
(Continued)

(52) U.S. Cl.
CPC ............ *H04W 76/14* (2018.02); *H04L 63/205* (2013.01); *H04W 4/80* (2018.02); *H04W 12/06* (2013.01);
(Continued)

(58) Field of Classification Search
CPC .................................. H04W 76/14; H04W 4/80
See application file for complete search history.

(56) References Cited

U.S. PATENT DOCUMENTS 8,346,672 B1 * 1/2013 Weiner .................. H04W 12/06
705/75
9,009,805 B1 * 4/2015 Kirkby ............... G06K 9/00711
726/7
(Continued)

FOREIGN PATENT DOCUMENTS

JP   2007-523532   8/2007
JP   2008-042632   2/2008
(Continued)

OTHER PUBLICATIONS

Japanese Office Action for Patent Application No. JP2016-153450 dated Nov. 12, 2019 (8 pages).

*Primary Examiner* — Andrew Lai
*Assistant Examiner* — Andrew C Lee
(74) *Attorney, Agent, or Firm* — Harness, Dickey & Pierce, P.L.C.

(57) ABSTRACT

A connection processing method includes receiving, by a first processor included in a communication device, first information that specifies a user of the communication device, executing an inquiry for a connection to one or more other communication devices, selecting a target communication device that has transmitted a response including information indicating that the target communication device has second information that specifies the user and has been acquired when the target communication device communicated with another communication device, from among the one or more other communication devices, and transmitting the first information to the target communication device, and receiving, by a second processor included in the target communication device, the first information from the communication device, executing connection processing without executing authentication processing of the user with the communication device, when the received first information (Continued)

matches with the second information, and executing a communication with the communication device.

5 Claims, 11 Drawing Sheets

(51) Int. Cl.
*H04L 29/06* (2006.01)
*H04W 12/06* (2009.01)
*H04W 76/10* (2018.01)
*H04W 84/20* (2009.01)
*H04W 76/11* (2018.01)
*H04W 88/06* (2009.01)

(52) U.S. Cl.
CPC ........... *H04W 76/10* (2018.02); *H04W 84/20* (2013.01); *H04W 76/11* (2018.02); *H04W 88/06* (2013.01)

(56) References Cited

U.S. PATENT DOCUMENTS

| | | | |
|---|---|---|---|
| 9,338,638 B1* | 5/2016 | Palin | H04W 12/06 |
| 9,842,330 B1* | 12/2017 | Van Os | G06Q 20/327 |
| 2002/0071477 A1* | 6/2002 | Orava | H04L 7/042 |
| | | | 375/132 |
| 2002/0131445 A1* | 9/2002 | Skubic | H04L 29/12254 |
| | | | 370/465 |
| 2005/0180425 A1 | 8/2005 | Ruuska et al. | |
| 2008/0106399 A1* | 5/2008 | Yaqub | G08B 13/1427 |
| | | | 340/539.11 |
| 2008/0228772 A1* | 9/2008 | Plamondon | G06F 16/9574 |
| 2011/0302630 A1* | 12/2011 | Nair | G06F 21/41 |
| | | | 726/4 |
| 2013/0198383 A1* | 8/2013 | Tseng | H04L 63/102 |
| | | | 709/225 |
| 2013/0217332 A1* | 8/2013 | Altman | H04H 60/90 |
| | | | 455/41.2 |
| 2013/0217333 A1* | 8/2013 | Sprigg | G06Q 30/0207 |
| | | | 455/41.2 |
| 2013/0262184 A1* | 10/2013 | Jain | G06Q 30/0205 |
| | | | 705/7.34 |
| 2013/0309971 A1* | 11/2013 | Kiukkonen | H04L 63/107 |
| | | | 455/41.2 |
| 2014/0189808 A1* | 7/2014 | Mahaffey | H04L 63/083 |
| | | | 726/4 |
| 2014/0254466 A1* | 9/2014 | Wurster | H04L 12/189 |
| | | | 370/312 |
| 2015/0081837 A1* | 3/2015 | Bernier | H04W 8/24 |
| | | | 709/217 |
| 2015/0215762 A1* | 7/2015 | Edge | H04W 8/005 |
| | | | 370/338 |
| 2015/0264728 A1* | 9/2015 | Milligan | H04W 76/14 |
| | | | 455/411 |
| 2015/0365817 A1* | 12/2015 | Chu | H04W 8/183 |
| | | | 455/41.2 |
| 2016/0112872 A1* | 4/2016 | McClement | H04W 12/06 |
| | | | 455/411 |
| 2016/0205345 A1* | 7/2016 | Homma | H04L 65/1073 |
| | | | 348/14.09 |
| 2016/0269973 A1* | 9/2016 | Miyamoto | H04W 40/246 |
| 2016/0285871 A1* | 9/2016 | Chathoth | H04L 63/0807 |
| 2017/0053249 A1* | 2/2017 | Tunnell | G06F 21/316 |
| 2017/0164172 A1 | 6/2017 | Kodama | |
| 2018/0039384 A1* | 2/2018 | DeLuca | H04W 4/80 |

FOREIGN PATENT DOCUMENTS

| | | |
|---|---|---|
| JP | 2016-082437 A | 5/2016 |
| WO | WO-2015/118753 A1 | 8/2015 |

* cited by examiner

CONNECTION PROCESSING METHOD, COMMUNICATION SYSTEM, AND COMMUNICATION DEVICE

CROSS-REFERENCE TO RELATED APPLICATION

This application is based upon and claims the benefit of priority of the prior Japanese Patent Application No. 2016-153450, filed on Aug. 4, 2016, the entire contents of which are incorporated herein by reference.

FIELD

The embodiment discussed herein is related to a connection processing method, a communication system, and a communication device.

BACKGROUND

In a short range wireless communication using Bluetooth (a registered trademark and the same shall apply hereinafter) or the like, a communication is performed between a master side wireless communication device (which will be hereinafter referred to as a "master terminal") and a slave side wireless communication device (which will be hereinafter referred to as a "slave terminal"). The master terminal is a device that controls a wireless communication during a communication with the slave terminal, and also, is a device that starts a communication. The slave terminal is a device that performs a communication under control of a wireless communication of the master terminal, and also, is a device to which the master terminal is coupled via a wireless communication.

A technology in which, when a device establishes a connection with another electronic device via a short range wireless communication, control is performed such that communication history information including information, which has been used for establishing a connection with the another electronic device, is not left in a storage unit has been known (for example, Japanese Laid-open Patent Publication No. 2008-42632). Using this technology, security when the device transmits and receives information to and from the another electronic device is increased. For example, Japanese National Publication of International Patent Application No. 2007-523532 discusses related art.

In a short range wireless communication, pairing of a master terminal and a slave terminal is performed, and a connection and a communication between the terminals are enabled. In other words, in a short range wireless communication, each time the master terminal is changed, pairing between the master terminal and the slave terminal is performed.

However, it takes time and labor to perform an operation of the pairing. For example, when the slave terminal is coupled to the master terminal at a host side, an operation in which a user selects a slave terminal that is to be coupled from a group of slave terminals that have been recognized by the master terminal and has been displayed on the master terminal occurs. Then, as the number of slave terminals that are selection targets increases, the time and labor of an operation of the pairing increase.

As a method for reducing the time and labor, there is a function of storing, at a slave side terminal, a master terminal which has once undergone an authentication procedure and been coupled to the slave terminal in advance and then establishing a connection with the master terminal without performing an authentication procedure. However, in this case, the number of master terminals that may be stored in the slave terminal is about one to eight. Therefore, if there are many master terminals that are capable of performing a short range wireless communication, a reconstruction is desired to be performed such that the master terminals may be recorded in the slave terminal. Assume that a configuration in which many master terminals may be recorded in a slave terminal is employed. In this case, for each of the master terminals, a user authenticates a plurality of user's own devices each of which is capable of performing a short range wireless communication as slave terminals and then performs pairing at least once. Because of this, it takes time and labor to perform an operation of the pairing. In view of the foregoing, it is desirable to reduce, in a short range wireless communication, the time and labor for coupling a device that has made an inquiry for a connection and one of devices that have responded to the inquiry to one another, while maintaining security.

SUMMARY

According to an aspect of the invention, a connection processing method executed by a communication system including a communication device and one or more other communication devices, the connection processing method includes receiving, by a first processor included in the communication device, first information that specifies a user of the communication device, executing an inquiry for a connection to the one or more other communication devices, selecting a target communication device that has transmitted, as a response to the inquiry, the response including information indicating that the target communication device has second information that specifies the user and has been acquired when the target communication device communicated with another communication device, from among the one or more other communication devices, and transmitting the first information to the target communication device, and receiving, by a second processor included in the target communication device, the first information from the communication device, executing connection processing without executing authentication processing of the user with the communication device, when the received first information matches with the second information, and executing a communication with the communication device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1:
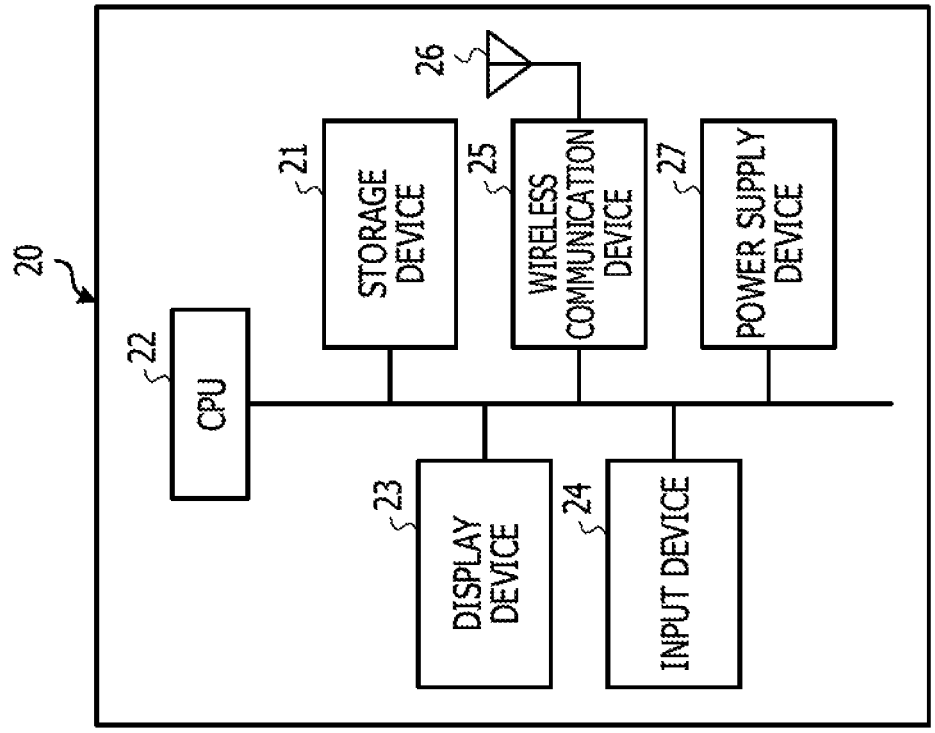
FIG. 1 is a diagram illustrating an example of a hardware configuration of a wireless communication system according to an embodiment.
Figure 1:
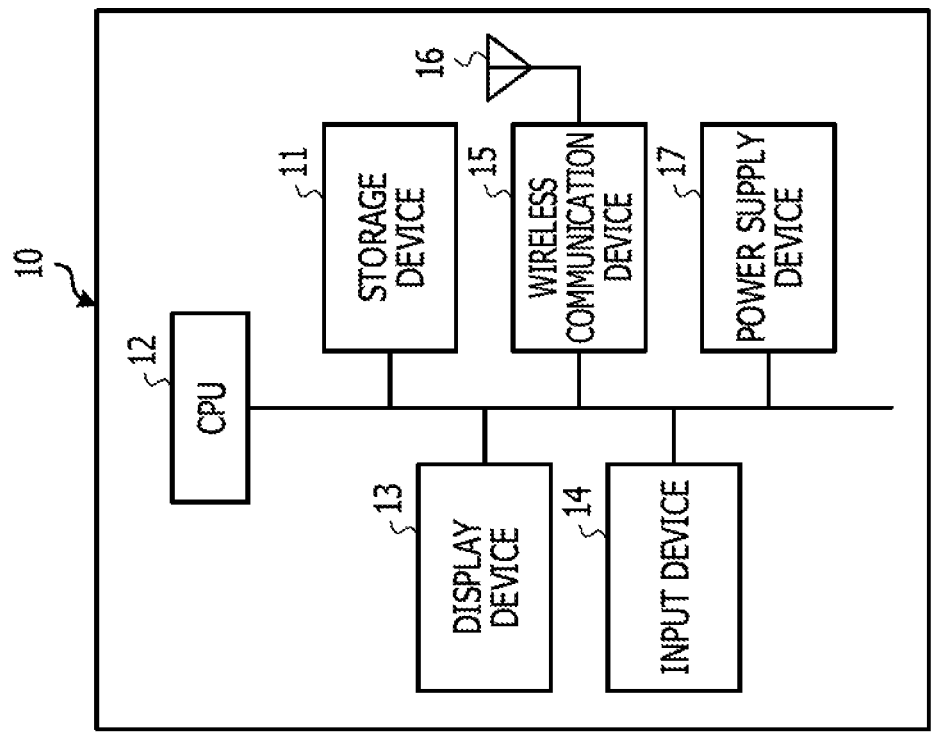

An embodiment will be described below in accordance with the accompanying drawings. In the present specification and drawings, the components having substantially the same functional configuration are denoted by the same reference character, and therefore, a redundant description is omitted.

First, a configuration of a hardware of a wireless communication system according to an embodiment will be described with reference to FIG. 1. A wireless communication system according to this embodiment includes a master terminal 10 and a slave terminal 20. The master terminal 10 and the slave terminal 20 perform a wireless communication using Bluetooth. The master terminal 10 is a device that controls a wireless communication during a communication with the slave terminal 20, and also, a device that starts a communication. The slave terminal 20 is a device that performs a communication under control of a wireless communication of the master terminal 10, and also, is a device to which the master terminal 10 is coupled via a wireless communication.

Each of the master terminal 10 and the slave terminal 20 is a wireless communication device that is capable of performing a short range wireless communication the maximum communication capable range of which is 10 m to 100 m. This embodiment will be described using a wireless communication using Bluetooth as an example. However, a wireless communication used for coupling the master terminal 10 and the slave terminal 20 is not limited to a wireless communication using Bluetooth. In the above-described wireless communication technology, there are cases in which the master terminal 10 and the slave terminal 20 may be commonly used in devices with unified standards, such as Bluetooth, or even in other products that correspond to one another, whether or not the products were manufactured by the same manufacturer.

Examples of the master terminal 10 and the slave terminal 20 include an information processing device, such as a personal computer, a tablet type terminal, a wearable device, such as a head mount display (HMD) or the like, a smartphone, a mobile phone, a personal digital assistant (PDA), a game device, a music player, or the like, which uses a wireless communication technology. The slave terminal 20 may be an electronic device, such as an output device, such as a headphone, a speaker, a mobile printer, or the like, an input device, such as a remote controller, a mouse, a keyboard, a barcode scanner, or the like, or a wearable device that measures blood pressure, pulse, heart rate, activity amount, step number, position information, or the like, which uses a wireless communication.

The master terminal 10 includes a storage device 11, a central processing unit (CPU) 12, a display device 13, an input device 14, a wireless communication device 15, an antenna 16, and a power supply device 17. The storage device 11 is, for example, RAM, ROM, flash memory, or the like. A program that realizes a function of the master terminal 10 and various data are stored in the RAM, the ROM, or the flash memory.

The CPU 12 performs an operation that realizes the function of the master terminal 10 in accordance with the program stored in the storage device 11. The display device 13 displays a state of the master terminal 10, a pairing screen, or the like. The input device 14 is a device, such as a touch panel, a keyboard, a mouse, a button, or the like, which is capable of performing an input operation. The wireless communication device 15 performs a wireless communication with the slave terminal 20 via the antenna 16. This wireless communication enables transmission and reception of a packet with the slave terminal 20 or the like.

Similarly, the slave terminal 20 includes a storage device 21, a CPU 22, a display device 23, an input device 24, a wireless communication device 25, an antenna 26, and a power supply device 27. The function of each of the units is the same as the function of the corresponding one of the units of the master terminal 10, and therefore, the description thereof will be omitted.

When being coupled to one another, the master terminal 10 and the slave terminal 20 perform pairing processing. In this case, before describing pairing processing according to this embodiment, pairing processing according to a comparative example will be described with reference to FIG. 2.

When pairing processing of the master terminal 10 and the slave terminal 20 is performed, the master terminal 10 makes an inquiry for a connection from the master terminal 10 to the slave terminal 20. If the slave terminal 20 is not in a connection standby state, the user operates a pairing button of the slave terminal 20 to put the slave terminal 20 in a pairing mode (a connection standby state) in advance (S200). For many slave terminals 20, pairing is started by performing long press of a power button.

Figure 2:
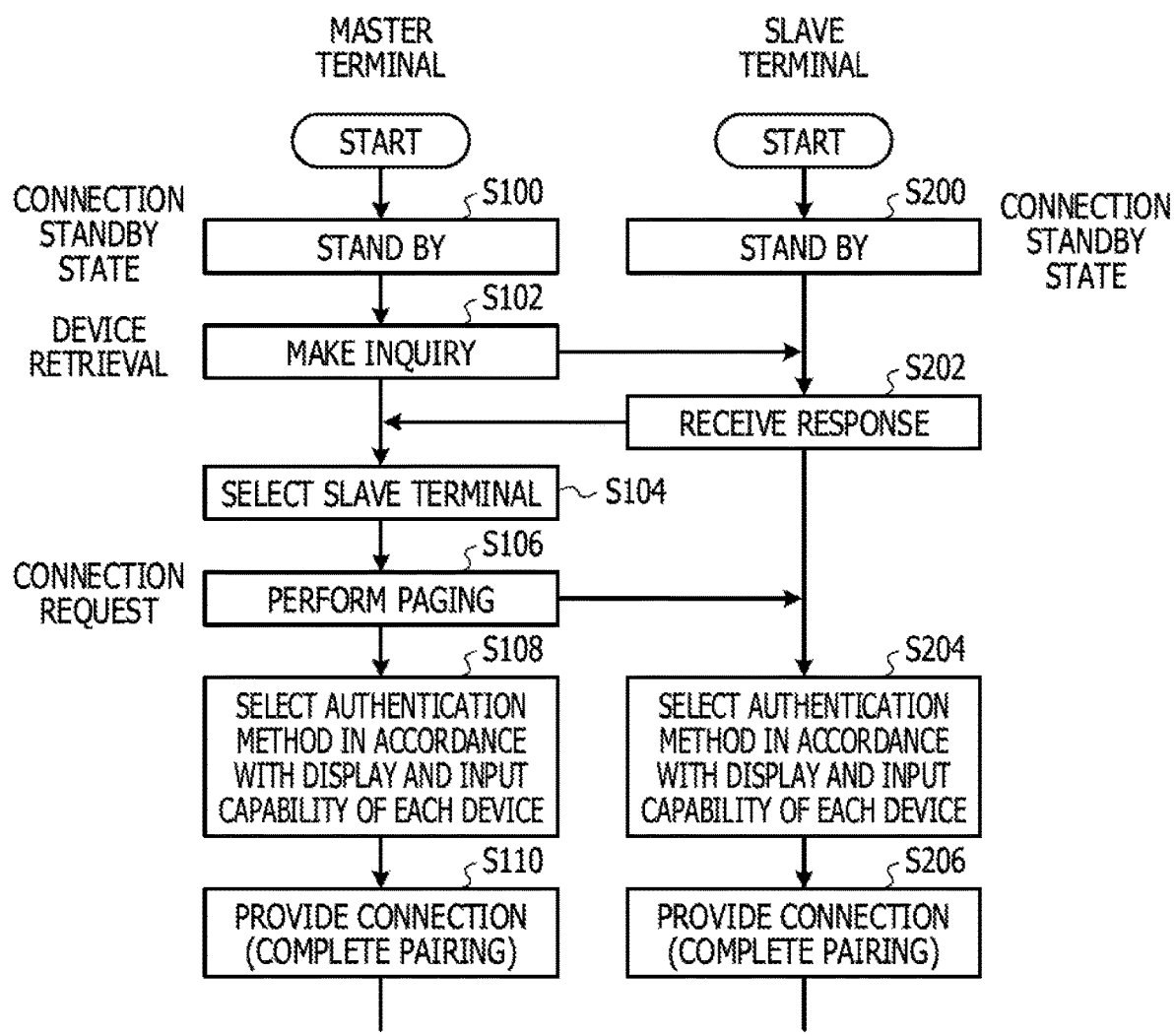
FIG. 2 is a flowchart illustrating an example of connection processing (pairing)

The master terminal 10 in a standby state (S100) makes an inquiry (S102). The master terminal 10 receives a response of the slave terminal 20 to the inquiry (S202). In FIG. 2, a single slave terminal 20 in a connection standby state is illustrated. However, there may be a case where, when there is a plurality of slave terminals 20 around the master terminal 10, multiple ones of the slave terminals 20 respond to the inquiry.

Figure 6A:
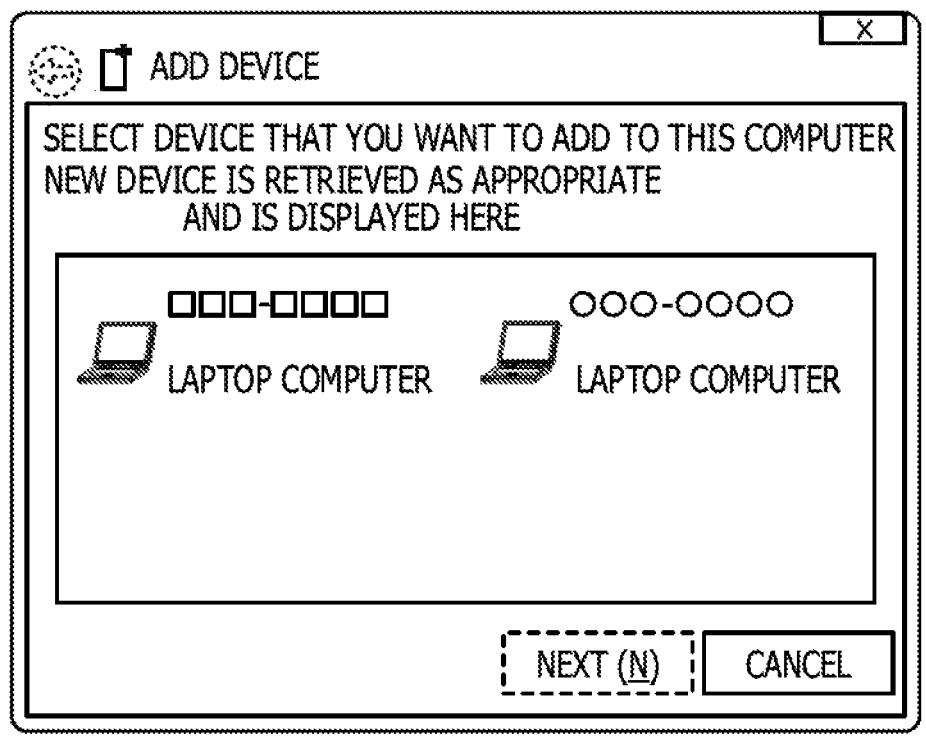
FIGS. 6A and 6B are views each illustrating an example of a pairing screen.

As a result of retrieval, a display of each device, which indicates the slave terminal 20, is displayed on the display device 13 of the master terminal 10. In FIG. 6A, an example of a screen indicating a result of retrieval of the slave terminals 20 around the master terminal 10 is illustrated. The master terminal 10 selects, among the slave terminals 20 displayed on the screen, a slave terminal 20 that is a pairing target (S104) and acquires information of the selected slave terminal 20. The master terminal 10 performs paging processing, based on the acquired information (S106). The master terminal 10 and the slave terminal 20 select an authentication method in accordance with their input capabilities, based on the display of each device (S108, S204). As the authentication method, one of a first method in which respective pass-keys of the master terminal 10 and the slave terminal 20 are displayed on the screens of the master terminal 10 and the slave terminal 20 and numbers at both terminals are compared to one another to determine a match therebetween, a second method in which a pass-key is displayed at one of the terminals and is input via a keyboard, and a third method in which nothing is displayed and thus the master terminal 10 and the slave terminal 20 are coupled to one another is selected.

Figure 6B:
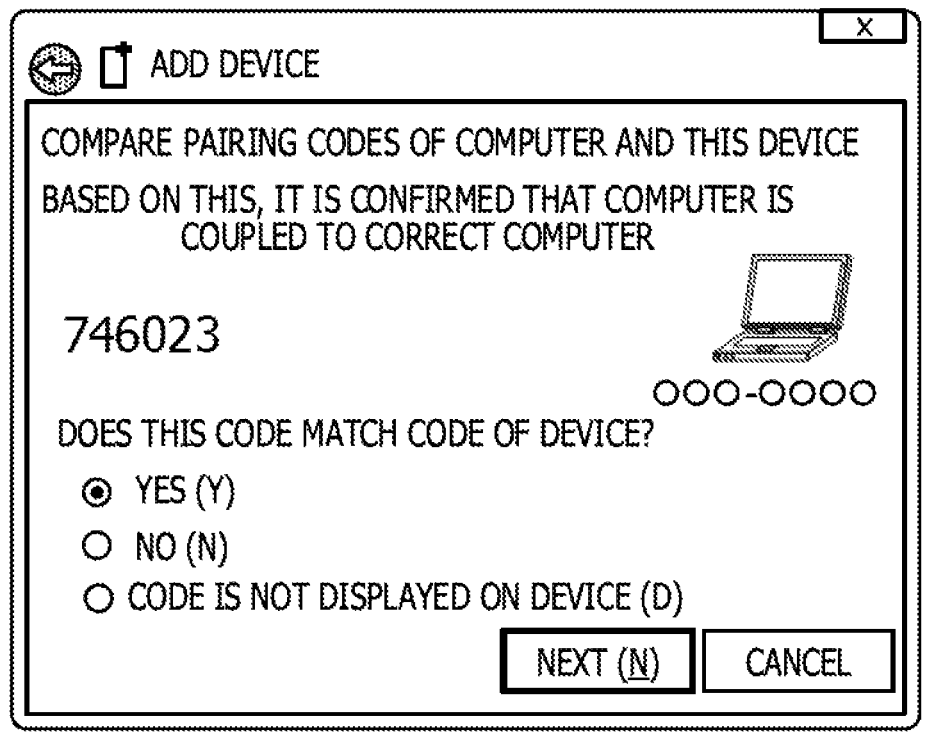

FIG. 6B illustrates an example of a screen when the first method is selected. A connection authentication operation used when the first method is selected is performed by "Numeric Comparison" in which a pass-key displayed on the screen of the master terminal 10 and a pass-key displayed on the screen of the slave terminal 20 are compared to one another.

The connection authentication operation used when the first method is selected is performed by "Numeric Comparison" in which a pass-key displayed on the screen of the master terminal 10 and a pass-key displayed on the screen of the slave terminal 20 are compared to one another. A connection authentication operation used when the second method is selected is performed by "Press-key Entry" in which the user is urged to input a pass-key displayed on the screen of the slave terminal 20 to the master terminal 10. A connection authentication operation used when the third method is selected is "Just Works" in which input of a pass-key is not performed and a confirmation procedure is not performed by the user. As a connection authentication method, a proper method is selected in accordance with a combination of whether or not there are the display screens of the master terminal 10 and the slave terminal 20 and whether or not there is an input device. Then, as a pass-key, a random multiple digit number (for example, a six digit number) is automatically generated. The pass-key is an example of an authentication number.

The master terminal 10 and the slave terminal 20 perform authentication by the selected authentication method and complete pairing processing (S110, S206).

The master terminal 10 and the slave terminal 20 store connection destination information. Therefore, in pairing processing, even when the power supply devices 17 and 27 are turned off and then are turned on, a reconnection of the master terminal 10 and the slave terminal 20 may be performed without performing pairing again. When pairing is completed, it is not possible to retrieve the slave terminal 20 from other devices.

However, when the master terminal 10 is changed, new pairing is performed. It takes time and labor to perform an operation of this pairing, resulting in reduction in operability. For example, for a delivery operation of a home delivery service or the like, a plurality of master terminals 10 exists, there is also a plurality of distribution centers, and a delivery worker uses, among the plurality of master terminals 10, an arbitrary master terminal 10 that is not used. Therefore, in a situation in which a connection to the master terminal 10 registered in the connection destination information is not practically possible, each time a connection to one of the other master terminals 10 is provided, a pairing operation of the master terminal 10 and the slave terminal 20 is performed.

As described above, for the pairing operation, many procedures are performed by the user, and many slave terminals that were made by the same manufacturer or are of the same model are used. In such an environment, a plurality of slave terminals that have been detected is indicated by the same name (alphanumeric characters), the same Bluetooth address, or the like in the list of slave terminals. Therefore, a slave that is desired to be coupled to the master terminal is not easily selected, and furthermore, in an environment in which different slave terminals, such as a smartphone, a barcode scanner, a mobile printer, or the like, are used, pairing is performed the same number of times as the number of the slave terminals, thus increasing a workload to a very high level. Although a pairing operation is performed on only specific slaves for exclusive use of delivery workers, the pairing operation is a redundant operation for device authentication.

In view of the foregoing, in a wireless communication system according to this embodiment, in a short range wireless communication, without selecting one of the slave terminals 20 that responded to an inquiry for a connection made by the master terminal 10, the master terminal 10 and the slave terminals 20 are coupled to one another. A functional configuration of each of the master terminal 10 and the slave terminal 20 of the wireless communication system according to this embodiment and pairing processing between the master terminal 10 and the slave terminal 20 will be sequentially described below.

Figure 3:
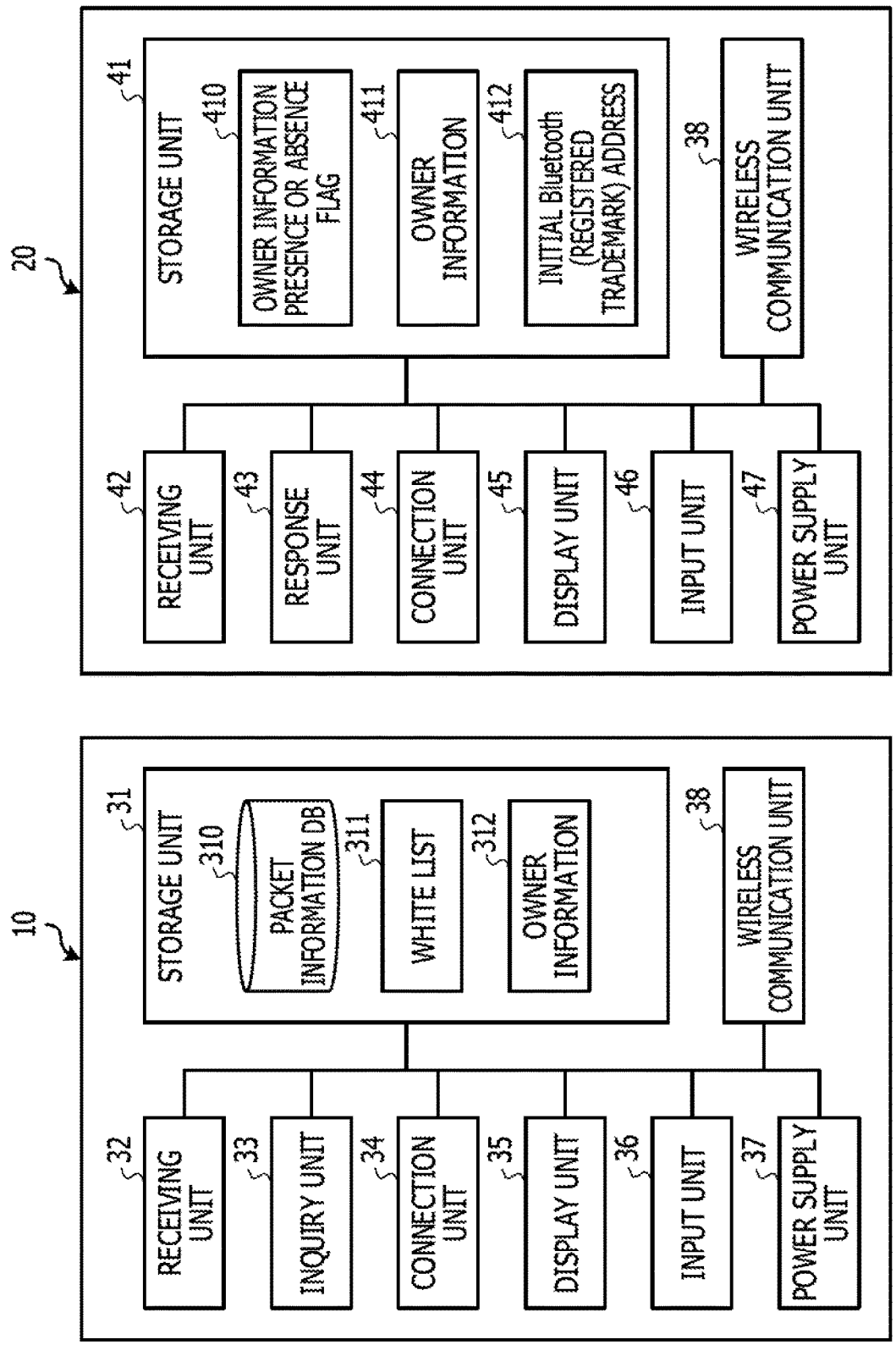
FIG. 3 is a diagram illustrating an example of a functional configuration of the wireless communication system according to the embodiment.

As illustrated in FIG. 3, the master terminal 10 includes a storage unit 31, a receiving unit 32, an inquiry unit 33, a connection unit 34, a wireless communication unit 38, a display unit 35, an input unit 36, a power supply unit 37, and a wireless communication unit 39. The storage unit 31 stores each of pieces of data of a packet information DB 310 and a white list 311. The storage unit 31 stores a user ID and a password that have been input at the time of login in owner information 312 at the time of login. The function of the storage unit 31 is realized, for example, by the storage device 11 of FIG. 1.

Figure 4A:
FIGS. 4A to 4D are diagrams each illustrating an example of a communication packet according to the embodiment.

As illustrated in FIG. 4A to FIG. 4D, the packet information DB 310 stores a Bluetooth packet. The Bluetooth packet is an example of a packet that is transmitted and received in a short range communication. As illustrated in FIG. 4A, a packet includes each of pieces of data of an access code, a header, and a payload (variable length).

Figure 4B:
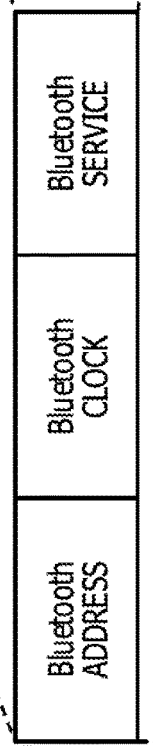

As illustrated in FIG. 4B, a frequency hop synchronization (FHS) packet that corresponds to the payload (variable length) includes each of pieces of data of a Bluetooth address, a Bluetooth clock, and a Bluetooth service. In this embodiment, in addition to the above-described pieces of data, each of pieces of data of an owner information presence or absence flag 410 and a Bluetooth address (which will be hereinafter referred to as an "initial Bluetooth address") 412 of the master terminal that was initially paired is added to the FHS packet that is transmitted from the slave terminal 20 to the master terminal 10 at the time of response to an inquiry. When the slave terminal 20 has owner information, the owner information presence or absence flag 410 is set on.

Figure 4C:
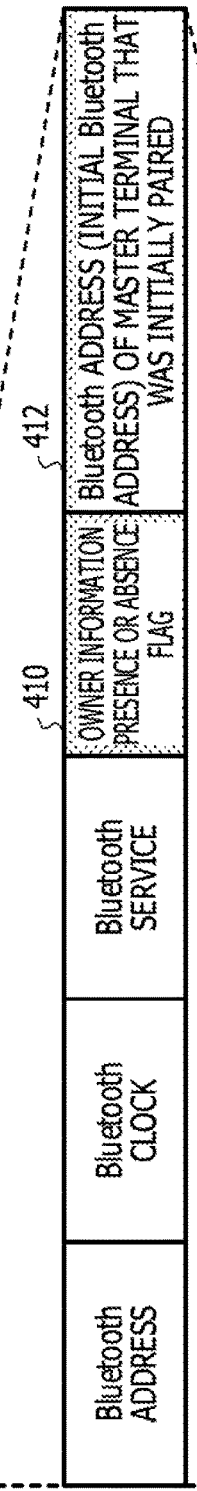
Figure 4D:
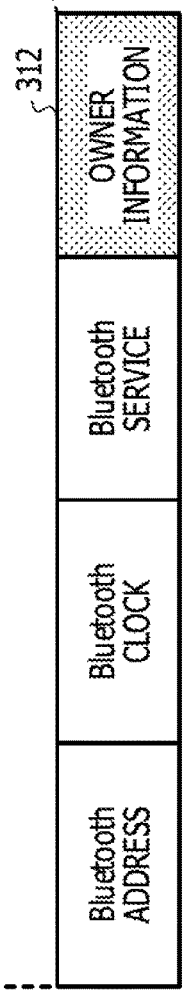

At the time of paging, in addition to the above-described pieces of data, data of owner information 312 illustrated in FIG. 4D is added to the FHS packet that is transmitted from the master terminal 10 to the slave terminal 20.

Based on the foregoing, the packet information stored in the packet information DB 310 includes the owner information presence or absence flag 410, owner information 411, and the initial Bluetooth address 412.

The owner information 312 is an example of information (user specific information) that specifies a user that uses the master terminal 10. Specific examples thereof include a user ID and a password. However, the information that specifies the user that uses the master terminal 10 is not limited thereto. For example, in biological authentication, authentication using a fingerprint or an iris, vein authentication in which the shape of the blood vessel of a palm or a finger is read, or the like may be used. The owner information presence or absence flag 410 is an example of information indicating that user specific information is included.

Figure 5:
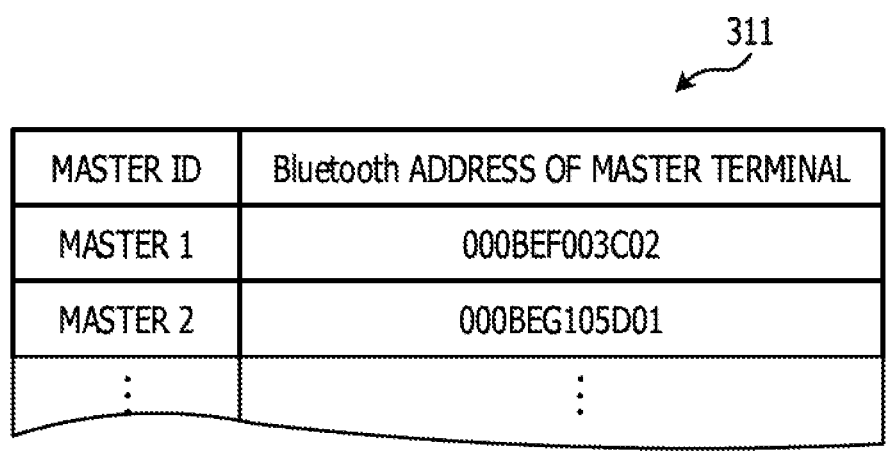
FIG. 5 is a table illustrating an example of a white list according to the embodiment.

As illustrated in FIG. 5, a master ID that indicates an ID of a master terminal and a Bluetooth address of the master terminal are stored in association with one another in the white list 311. In the white list 311, the master IDs of master terminals of all business offices and the Bluetooth addresses of the master terminals are stored.

The packet information DB 310 and the white list 311 may be stored in the storage device 11, a server that is coupled to the master terminal 10 via a network, another server on a cloud, or the like.

Returning to FIG. 3, the receiving unit 32 receives a user ID and a password of the user that uses the master terminal 10. The inquiry unit 33 makes an inquiry (an inquiry for a connection) to the slave terminal 20. The connection unit 34 controls a connection with the slave terminal 20. Each of the functions of the receiving unit 32, the inquiry unit 33, the connection unit 34, and the wireless communication unit 38 is realized, for example, by processing that the corresponding one of various programs installed in the storage device 11 of FIG. 1 causes the CPU 12 to execute.

The display unit 35 displays a state of the master terminal 10, a pairing screen, or the like. For example, the display unit 35 displays a pairing screen illustrated in FIG. 6A. On the pairing screen, devices of the slave terminals 20, which responded to an inquiry, are displayed such that the devices may be selected. The display unit 35 displays a pairing screen illustrated in FIG. 6B. On the pairing screen, a pairing code that is used for a connection is displayed. The function of the display unit 35 is realized, for example, by the display device 13 of FIG. 1.

The input unit 36 inputs input information by a touch operation and a keyboard operation. The function of the input unit 36 is realized, for example, by the image reading unit 14 of FIG. 1. The power supply unit 37 supplies power to each unit of the master terminal 10. The function of the power supply unit 37 is realized, for example, by the power supply device 17 of FIG. 1.

The wireless communication unit 39 performs a wireless communication with the slave terminal 20. The wireless communication unit 39 transmits a packet (see FIG. 4D) including the owner information 312 to the slave terminal 20 that made a response that indicates that the owner information presence or absence flag 410 has been set on, among the slave terminals 20 that responded to the inquiry. The function of the wireless communication unit 39 is realized, for example, by the wireless communication device 15 of FIG. 1.

Figure 7:
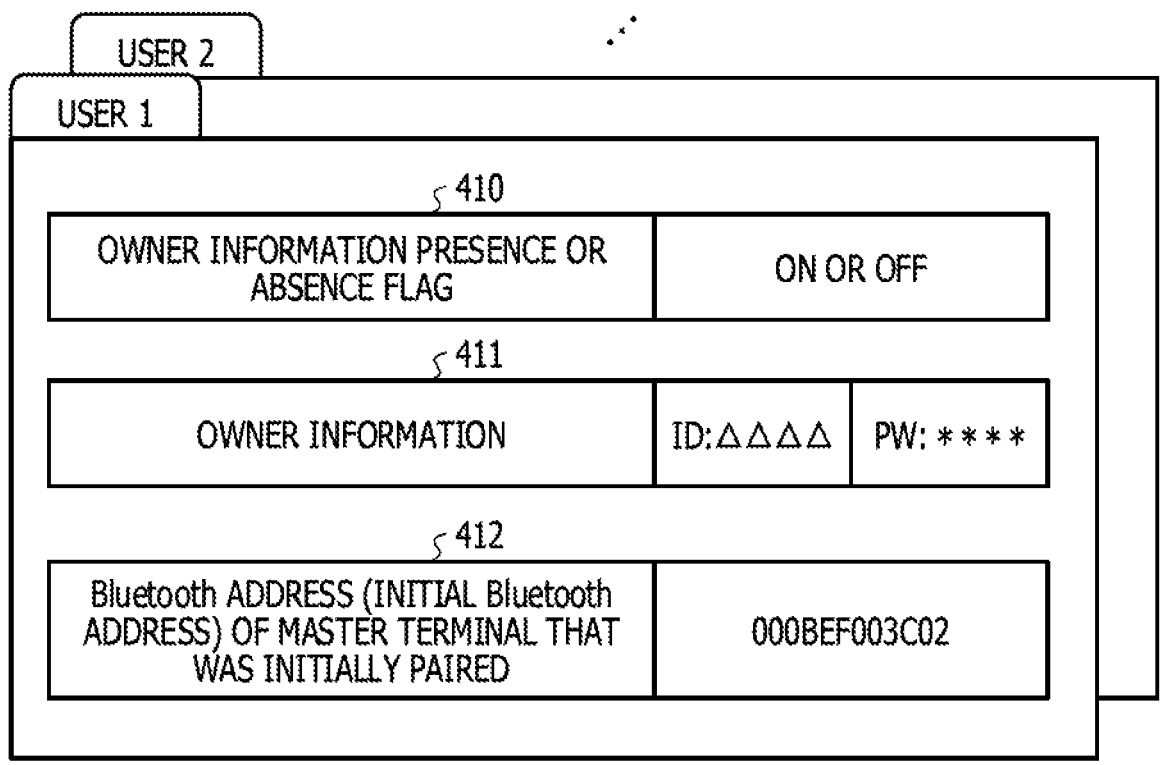
FIG. 7 is a view illustrating an example of owner information or the like for each user according to the embodiment.

The slave terminal 20 includes a storage unit 41, a receiving unit 42, a response unit 43, a connection unit 44, a display unit 45, an input unit 46, a power supply unit 47, and a wireless communication unit 48. As illustrated in FIG. 7, the storage unit 41 stores the owner information presence or absence flag 410, the owner information 411, and the initial Bluetooth address 412 for each user. The function of the storage unit 41 is realized, for example, by the storage device 21 of FIG. 1.

The receiving unit 42 receives the inquiry from the master terminal 10. The response unit 43 makes a response to the inquiry. The response includes the owner information presence or absence flag 410. The wireless communication unit 38 transmits the owner information 312 (see FIG. 4D) to the slave terminal 20 for which the owner information presence or absence flag 410 has been set on, among the slave terminals 20 that responded to the inquiry.

The connection unit 44 determines whether or not the owner information 312 and the owner information 411 stored in the storage unit 41 match one another. If the connection unit 44 has determined that the owner information 312 and the owner information 411 match one another, the connection unit 44 performs connection processing with the master terminal 10. Each of the receiving unit 42, the response unit 43, and the connection unit 44 is realized, for example, by processing that the corresponding one of various programs stored in the storage device 21 of FIG. 1 causes the CPU 22 to execute.

The display unit 45 displays, for example, the pairing screen illustrated in FIG. 6B. On the pairing screen, a pairing code (a pass-key) used for a connection is displayed. The function of the display unit 45 is realized, for example, by the display device 23 of FIG. 1.

The input unit 46 inputs input information by a touch operation or a keyboard operation. The function of the input unit 46 is realized, for example, by the input device 24 of FIG. 1. The power supply unit 47 supplies power to each unit of the master terminal 10. The function of the power supply unit 47 is realized, for example, by the power supply device 27 of FIG. 1.

The wireless communication unit 48 performs a wireless communication with the master terminal 10. In making a response to an inquiry, the wireless communication unit 48 transmits a packet (see FIG. 4C) including the owner information presence or absence flag 410 and the initial Bluetooth address 412. The function of the wireless communication unit 48 is realized, for example, by the wireless communication device 25 of FIG. 1.

FIG. 3 is a block diagram of each of the master terminal 10 and the slave terminal 20 with focus on their functions. Each unit illustrated in function blocks of FIG. 3 may be realized by only a hardware, only a software, or a combination of a hardware and a software.

Figure 8:
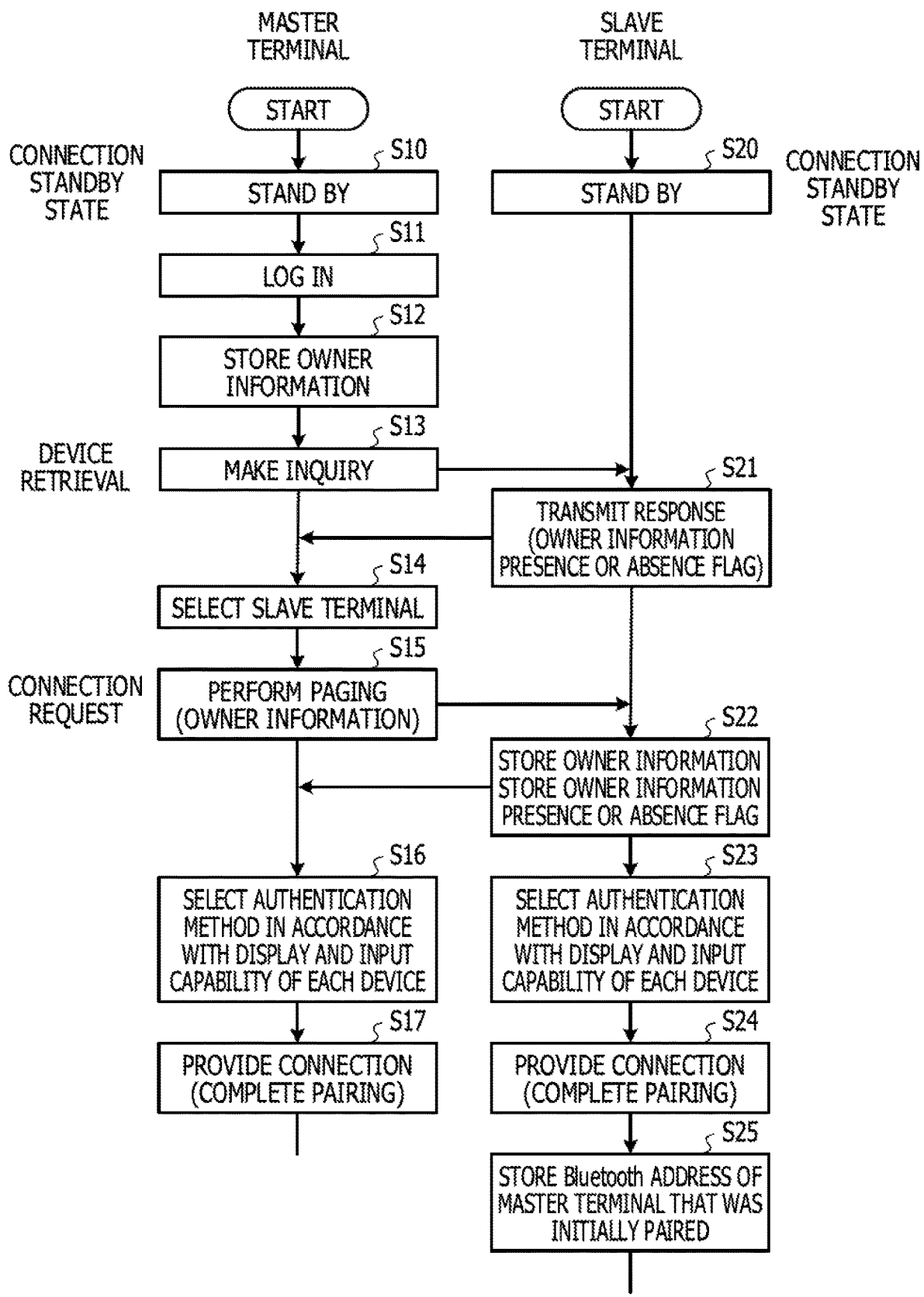
FIG. 8 is a flowchart illustrating an example of initial connection processing (pairing) according to the embodiment.
Figure 9:
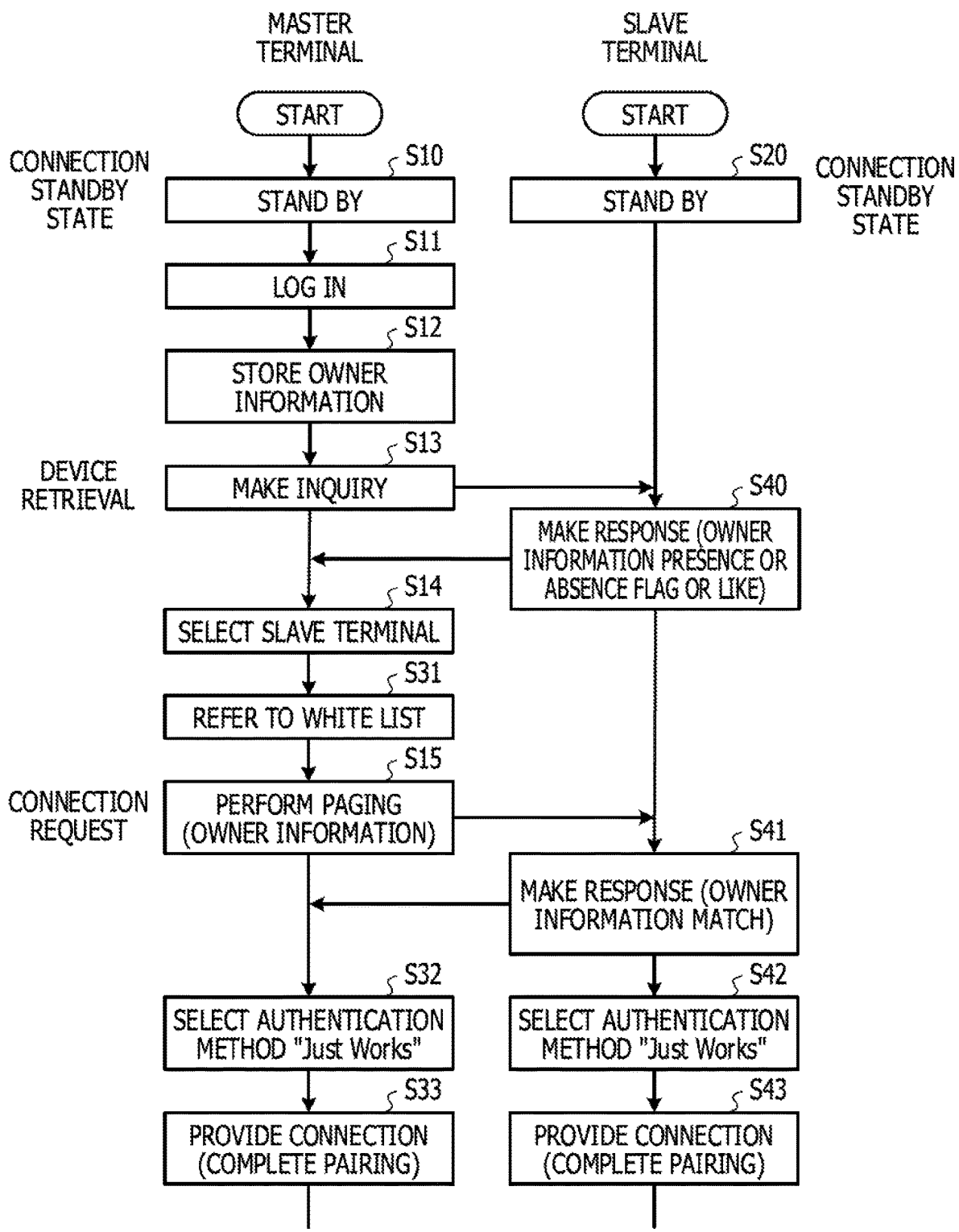
FIG. 9 is a flowchart illustrating an example of second or subsequent communication processing according to the embodiment.

Next, connection processing according to this embodiment will be described with reference to FIG. 8 and FIG. 9. FIG. 8 is a flowchart illustrating an example of initial connection processing according to this embodiment. FIG. 9 is a flowchart illustrating an example of second or subsequent communication processing according to this embodiment.

First, initial connection processing will be described with reference to FIG. 8. In FIG. 8, on the left side, connection processing performed by the master terminal 10 is illustrated. On the right side, connection processing performed by the slave terminal 20 is illustrated.

When pairing of the master terminal 10 and the slave terminal 20 is performed, the master terminal 10 and the slave terminal 20 are in a connection standby state (S10, S20). If the slave is not in a connection standby state, the user operates a pairing button of the slave terminal 20. Then, the user puts the slave terminal 20 in a pairing mode (a connection standby state) (S20).

The receiving unit 32 of the master terminal 10 receives a login operation of the user (S11). The storage unit 31 of the master terminal 10 stores the user ID and the password that have been input in the owner information 312 at the time of login (S12). Next, the wireless communication unit 38 of the master terminal 10 makes an inquiry (S13) and retrieves the slave terminal 20 in a communication available range.

The response unit 43 of the slave terminal 20 transmits a response to the inquiry to the master terminal 10 (S21). The response of the slave terminal 20 includes the owner information presence or absence flag 410.

As illustrated in FIG. 6A, in accordance with the responses of the slave terminals 20 to the inquiry, the connection unit 34 of the master terminal 10 selects the slave terminal 20 on which pairing is performed from a screen indicating a result of retrieval of the slave terminals 20 that responded (S14).

The master terminal 10 of the connection unit 34 performs paging processing (S15). Then, the wireless communication unit 38 of the master terminal 10 transmits a packet including the owner information 312 of FIG. 4D. The storage unit 41 of the slave terminal 20 stores owner information included in the packet and sets on an owner information presence or absence flag indicating that the storage unit 41 has stored the owner information (S22).

The connection unit 34 of the master terminal 10 and the connection unit 44 of the slave terminal 20 select, for example, as illustrated in FIG. 6B, an authentication method ("Numeric Comparison") in which pass-keys displayed on the screens of the master terminal 10 and the slave terminal 20 are compared to one another (S16, S23). Thus, the pass-keys are displayed at both of the master terminal 10 and the slave terminal 20 and are compared with one another to determine whether or not the pass-keys match one another at both terminals. If the pass-keys match one another at both terminals, the connection unit 34 of the master terminal 10 and the connection unit 44 of the slave terminal 20 complete a connection (pairing) (S17, S24). The storage unit 41 of the slave terminal 20 stores the initial Bluetooth address 412, which is the Bluetooth address of the master terminal that has been paired in this (that is, initial) authentication (S25).

Next, second or subsequent connection processing will be described with reference to FIG. 9. In FIG. 9, on the left side, connection processing performed by the master terminal 10 is illustrated. On the right side, connection processing performed by the slave terminal 20 is illustrated.

When the master terminal 10 and the slave terminal 20 are in a standby state (S10, S20), the receiving unit 32 of the master terminal 10 receives a login operation (S11). The storage unit 31 of the master terminal 10 stores a user ID and a password that have been input in the owner information 312 at the time of login (S12). Next, the wireless communication unit 38 of the master terminal 10 makes an inquiry (S13) and retrieves the slave terminal 20 in a communication available range.

The response unit 43 of the slave terminal 20 makes a response to the inquiry (S40). In the second or subsequent processing, a packet of the response includes the owner information presence or absence flag 410 and the initial Bluetooth address 412, which are illustrated in FIG. 4C.

The connection unit 34 of the master terminal 10 selects, as illustrated in FIG. 6A, the slave terminal 20 that is a pairing target from a screen indicating a result of retrieval of the slave terminals 20 that responded (S14). Then, the connection unit 34 acquires information of the selected slave terminal 20.

Next, the connection unit 34 determines whether or not the initial Bluetooth address 412 exists in the white list 311 (S31). Next, if the connection unit 34 has determined that the initial Bluetooth address 412 exists in the white list 311, the connection unit 34 performs paging processing, based on the acquired information (S15). In this case, the owner information 312 at the time of login, which is illustrated in FIG. 4D, is notified to the slave terminal 20.

The connection unit 44 of the slave terminal 20 determines whether or not the notified owner information 312 and the owner information 411 stored in the storage unit 41 match one another. If the connection unit 44 has determined that the owner information 312 and the owner information 411 match one another, the connection unit 44 makes a response to the master terminal 10 (S41). For example, as illustrated in FIG. 6B, the notified owner information 312 is displayed as a pass-key on the screens of the master terminal 10 and the slave terminal 20. If the pass-key displayed on the screens matches the stored owner information 411, the master terminal 10 and the slave terminal 20 select "YES" on the screens. As a result, a response indicating that authentication is completed is transmitted from the slave terminal 20 to the master terminal 10.

When the connection unit 34 of the master terminal 10 receives the response, the connection unit 34 selects "Just Works" as an authentication method (S32). After transmitting the response, the connection unit 44 of the slave terminal 20 selects "Just Works" as an authentication method (S42). Thus, the respective connection units 34 and 44 of the terminals complete a connection (pairing) (S33, S43).

By the connection processing of FIG. 8 and the connection processing of FIG. 9, an initial pairing and second or subsequent pairing of the master terminal 10 and the slave terminal 20 are completed. In the following, first, the connection processing at a master terminal 10 side of the connection processing of the master terminal 10 and the connection processing of the slave terminal 20, which have been described above, will be described with reference to FIG. 10. Thereafter, the connection processing at a slave terminal 20 side will be described with reference to FIG. 11.

Figure 10:
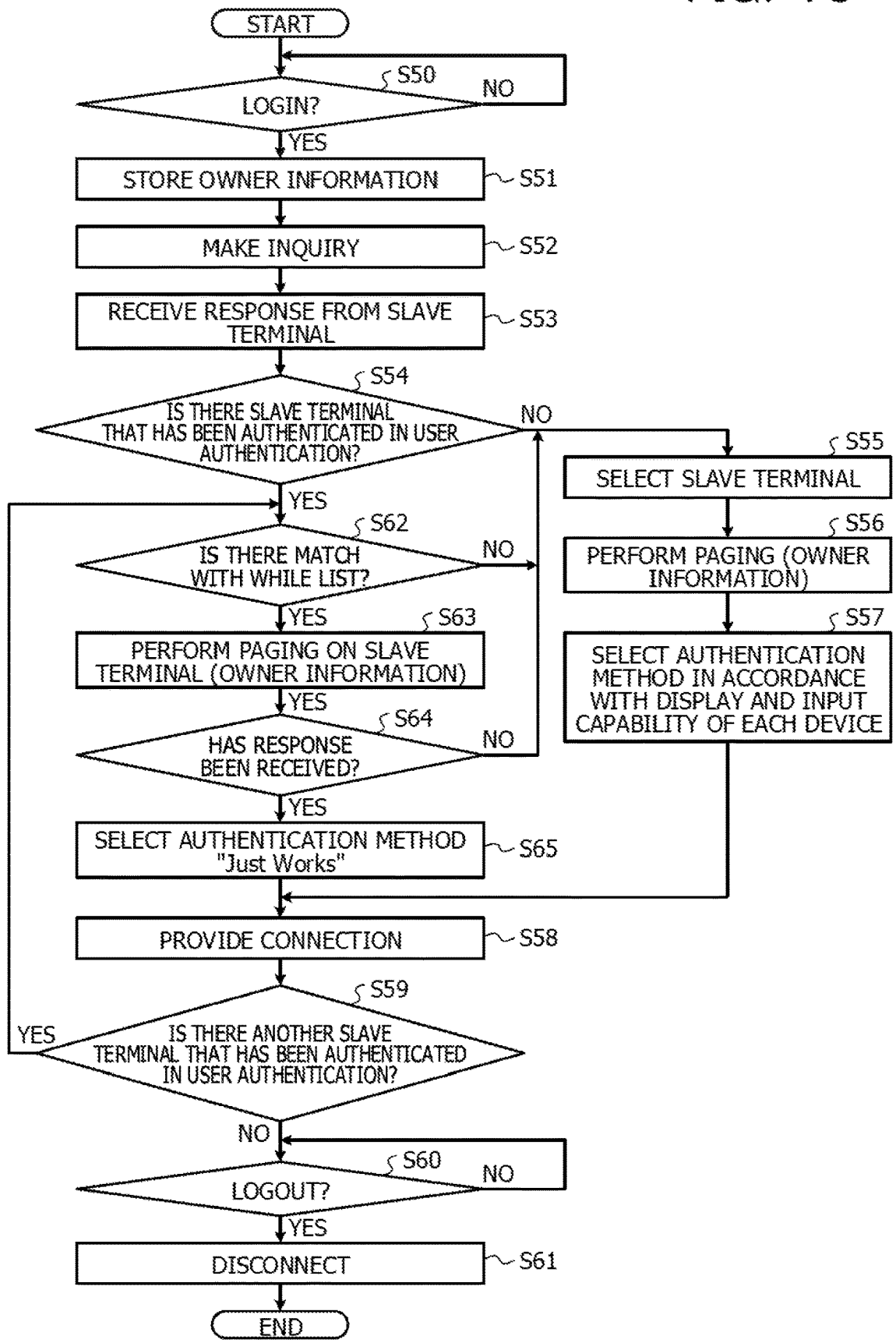
FIG. 10 is a flowchart illustrating an example of connection processing at a master terminal side according to the embodiment.

In the connection processing of the master terminal 10 illustrated in FIG. 10, first, the receiving unit 32 receives a (initial) login (S50). When the receiving unit 32 receives the login, the storage unit 31 stores a user ID and a password that have been received in the owner information 312 at the time of login (S51). Next, the inquiry unit 33 makes an inquiry (S52) and retrieves the slave terminal 20 that is connectable.

The connection unit 34 receives a response (S71 in FIG. 11) of the slave terminal 20 to the inquiry (S53). The response of the slave terminal 20 includes the owner information presence or absence flag 410.

Next, the connection unit 34 determines whether or not there is the slave terminal 20 that has been authenticated in user authentication (S54). In this case, if the owner information presence or absence flag 410 has been set on, the connection unit 34 determines that the slave terminal 20 has been authenticated in user authentication. On the other hand, if the owner information presence or absence flag 410 has been set off, the connection unit 34 determines that the slave terminal 20 has not been authenticated in user authentication.

At an initial connection, the owner information presence or absence flag 410 is set off and the slave terminal 20 has not been authenticated in user authentication. Therefore, the process proceeds to S55. Then, the connection unit 34 selects, as illustrated in FIG. 6A, one of the slave terminals 20 from the screen indicating a result of retrieve on which the slave terminals 20 that responded are displayed as devices.

Then, the connection unit 34 performs paging processing (S56) and transmits a packet including the owner information 312 of FIG. 4D. The connection unit 34 selects an authentication method in accordance with input capability (S57) and performs a connection (pairing) by the selected authentication method (S58).

Next, the connection unit 34 determines whether or not there is another slave terminal 20 that has been authenticated in user authentication (S59). In initial processing, there is not another slave terminal 20 that has been authenticated in user authentication, and therefore, the process proceeds to S60.

If the connection unit 34 has determined that there is not another slave terminal 20 that has been authenticated in user authentication, the receiving unit 32 determines whether or not the user has been logged out (S60). When the receiving unit 32 receives a logout, a connection is cut off (S61) and the process is terminated.

When the receiving unit 32 receives a login next (S50), the storage unit 31 stores an ID and a password that have been input in the owner information 312 at the time of login (S51). Next, the inquiry unit 33 makes an inquiry (S52) and retrieves the slave terminal 20 in a communication available range.

The connection unit 34 receives a response (S71 in FIG. 11) of the slave terminal 20 to the inquiry (S53).

Next, the connection unit 34 determines whether or not there is the slave terminal 20 that has been authenticated in user authentication (S54). At a second connection, the owner information presence or absence flag 410 is set on and the slave terminal 20 has been authenticated in user authentication. Therefore, the connection unit 34 determines whether or not the initial Bluetooth address 412 exists in the white list 311 (S62). If the initial Bluetooth address 412 does not exist in the white list 311, the process proceeds to S55. Then, the connection unit 34 executes processing of S55 and subsequent steps in a manner described above. On the other hand, if the initial Bluetooth address 412 exists in the white list 311, the process proceeds to S63.

When the process proceeds to S63, the connection unit 34 performs paging processing on the slave terminal 20 (S63). Then, the wireless communication unit 38 transmits a packet including the owner information 312 of FIG. 4D.

The connection unit 34 determines whether or not a response from the slave terminal 20 has been received (S64). If the response from the slave terminal 20 has not been received, the process proceeds to S55 and processing of S55 and subsequent steps is performed. If the response from the slave terminal 20 has been received, the connection unit 34 selects "Just Works" as an authentication method and completes a connection (pairing) (S58). Next, the connection unit 34 determines whether or not there is another slave terminal 20 that has been authenticated in user authentication (S59). If the connection unit 34 has determined that there is another slave terminal 20 that has been authenticated in user authentication, the process returns to S62 and, for the another slave terminal 20 that has been authenticated in user authentication, the processing of S62 and subsequent steps are repeated until there is no longer another slave terminal 20 that has been authenticated in user authentication.

On the other hand, if the connection unit 34 has determined that there is not another slave terminal 20 that has been authenticated in user authentication, the receiving unit 32 determines whether or not the user has been logged out (S60). When the receiving unit 32 receives a logout, a connection is cut off (S61) and the process ends.

Figure 11:
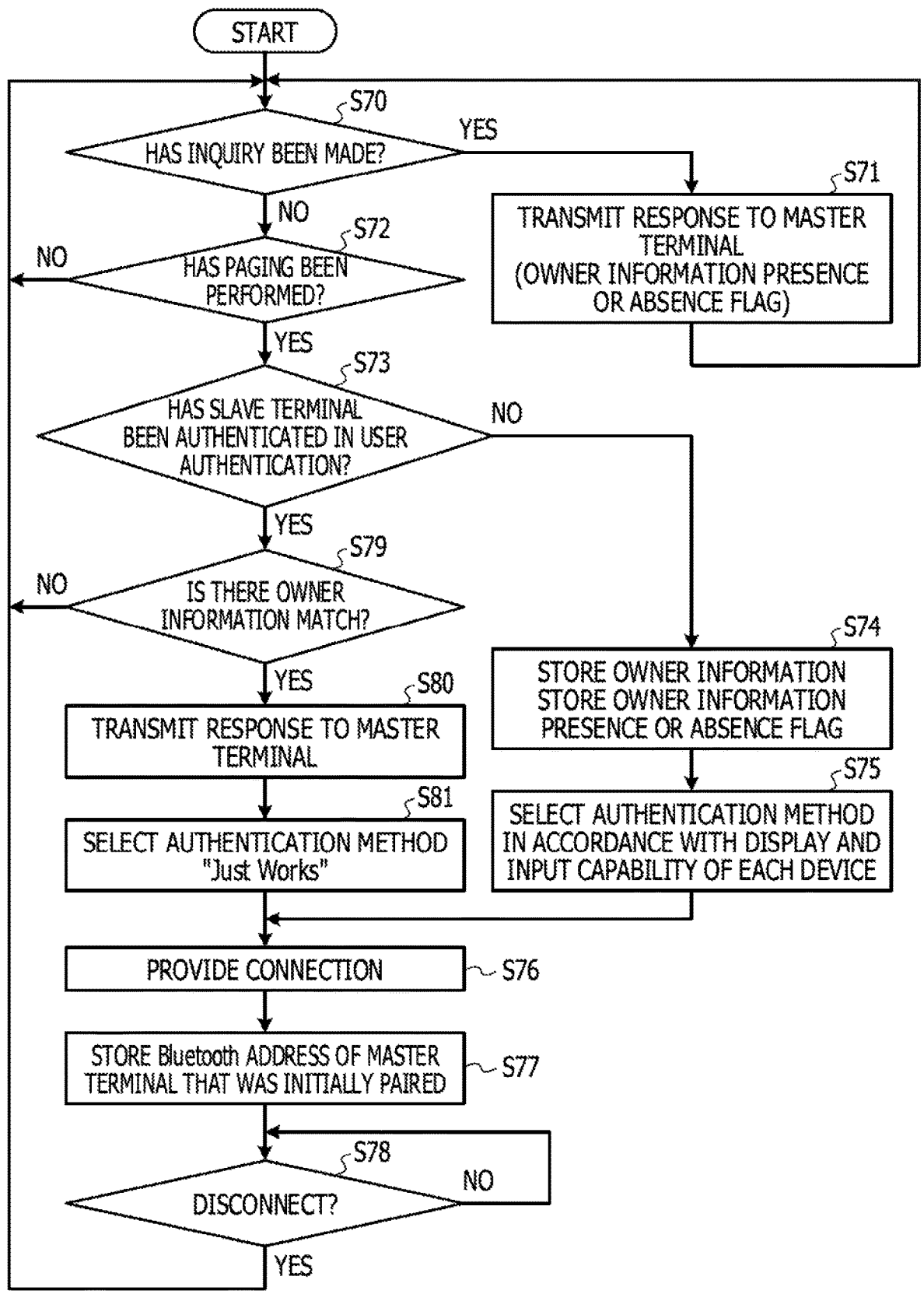
FIG. 11 is a flowchart illustrating an example of connection processing at a slave side according to the embodiment.

In the connection processing of the slave terminal 20, which is illustrated in FIG. 11, first, the receiving unit 42 determines whether or not the receiving unit 42 has received an inquiry (S70). When the receiving unit 42 receives an inquiry, the response unit 43 transmits a response to the inquiry to the master terminal 10 (S71). After the response unit 43 transmits the response, the process returns to S70 and the receiving unit 42 receives a next inquiry (S70).

If the receiving unit 42 has not received an inquiry, the process proceeds to S72 and the connection unit 44 determines whether or not paging has been performed. If the connection unit 44 has determined that paging has not been performed, the process returns to S70 and the connection unit 44 waits for a next inquiry to be received.

On the other hand, if the connection unit 44 has determined that paging has been performed, the connection unit 44 determines whether or not the slave terminal 20 that is a self-device of the connection unit 44 has been authenticated in user authentication (S73). If the owner information presence or absence flag 410 has been set on, the connection unit 44 determines that the slave terminal 20 has been authenticated in user authentication and, if the owner information presence or absence flag 410 has been set off, the connection unit 44 determines that the slave terminal 20 has not been authenticated in user authentication.

At an initial connection, the owner information presence or absence flag 410 is set off and the slave terminal 20 has not been authenticated in user authentication. Therefore, the connection unit 44 stores the owner information 312 illustrated in FIG. 4D in the owner information 411 of the storage unit 41 and sets on the owner information presence or absence flag 410 to store the owner information presence or absence flag 410 (S74). Next, the display unit 45 displays a result of retrieval and each device, which indicates the corresponding slave terminal 20, and the connection unit 44 selects an authentication method in accordance with input capability (S75) and performs coupling (pairing) by the selected authentication method (S76). The storage unit 41 stores the initial Bluetooth address 412 of the master terminal that has been paired in this (that is, initial) authentication in the initial Bluetooth address 412 (S77). Next, the receiving unit 32 determines whether or not a connection has been cut off (S78) and, if the receiving unit 32 determines that the connection has been cut off, the process returns to S70 and the receiving unit 32 determines whether or not there is a second or subsequent inquiry.

If the receiving unit 42 has determined that there is not the second or subsequent inquiry (S70), the connection unit 44 determines whether or not paging has been performed (S72). If the connection unit 44 has determined that paging has been performed, the connection unit 44 determines whether or not the slave terminal 20 that is a self-device has been authenticated in user authentication (S73). At an initial connection, the owner information presence or absence flag 410 is set on in S74. Therefore, the connection unit 44 determines that the slave terminal 20 has been authenticated in user authentication and determines whether or not the owner information 312 notified from the master terminal 10 and the owner information 411 stored in the storage unit 41 match one another (S79). If it is determined that the owner information 312 and the owner information 411 do not match one another, the process returns to S70 and, if it is determined that the owner information 312 and the owner information 411 match with one another, the process proceeds to S80.

In S80, the connection unit 44 transmits a response to the master terminal 10. The response is received by the master terminal 10 in S64 of FIG. 10. Next, the connection unit 44 selects "Just Works" as an authentication method (S81) and completes a connection (pairing) (S76). Next, the connection unit 44 determines whether or not a connection has been cut off (S78) and, if the connection has been cut off, the process returns to S70 (S61).

As has been described above, in a wireless communication system according to an embodiment, in initial pairing, owner information, such as a user ID, a password, or the like, is recorded in the slave terminal 20 and a user and the slave terminal 20 are linked to one another via the master terminal 10.

In a second or subsequent pairing, when a user logs in on the master terminal 10, it is determined whether or not the owner information 312 at the time of login, which is stored in the master terminal 10, and the owner information 411 stored in the slave terminal 20 match one another. Thus, it is enabled to automatically check whether or not the owner of the slave terminal 20 and the user that is logged in on the master terminal 10 match one another.

In order to provide information to a specific device, a paging procedure may be performed. In this embodiment, in the paging procedure, the "owner information 312" is added to information that is provided. Then, in the second or subsequent pairing, if the owner information 312 and the owner information 411 do not match one another, the process proceeds to the pairing processing illustrated in S74 to S76.

However, if the owner information 312 and the owner information 411 match one another, the master terminal 10 and the slave terminal 20 may be automatically coupled to one another without selecting one terminal of the slave terminals 20 that responded to the inquiry. Thus, a user operation performed with connection authentication between terminals, that is, the master terminal 10 and the slave terminal 20, which is conventionally performed each time the master terminal 10 is changed may be automated without reducing security. The automatic authentication method described above does not allow spoofing and enables reduction in time and labor in performing a pairing operation between wireless communication devices without reducing the security level.

In this embodiment, authentication (Just Works) in which a pass-key is not input and a check procedure performed by a user is not used is performed. Therefore, a function of arbitrarily selecting an authentication method is also included. It is possible to automate an operation by a user, which has been conventionally performed for device authentication but is redundant. It is also possible to display the slave terminal 20 that has been authenticated in user authentication on the screen of the master terminal 10 to ask the user whether or not the user allows a connection.

In performing pairing with the master terminal 10 that may be authenticated by biological authentication using a fingerprint, a vein pattern, an iris, or the like, biological authentication data itself may be recorded in the slave terminal 20, and thereby, the accuracy of user authentication may be increased. When the owner of the slave terminal 20 is changed, the owner information is cleared by restoring the state of the slave terminal 20 to a state at the time of shipment from a factory using an initialization button provided in the slave terminal 20.

There is a risk that, when a malicious third person prepares an unauthorized slave terminal 20 that returns a false declaration that the unauthorized slave terminal 20 is a terminal that has been authenticated in user authentication to the master terminal 10, owner information, such as a login ID or the like, is transmitted from the master terminal 10 to the unauthorized terminal and is recorded in the unauthorized terminal. To deal with such a case, each master terminal 10 is configured such that the white list 311 indicating a list of Bluetooth addresses of reliable master terminals 10 is stored in the storage device 11 illustrated in FIG. 1 in advance. Then, the master terminal 10 determines whether or not the "initial Bluetooth address 412" included in information that is acquired by an inquiry exists in the white list 311. If the initial Bluetooth address 412 does not exist in the white list 311, it is determined that the slave terminal 20 is an unreliable slave terminal 20. A configuration in which owner information is not transmitted to the unreliable slave terminal 20 is employed, and thereby, reduction in security may be reduced.

A wireless communication device, a wireless communication system, a connection processing method, and a connection processing program have been described in the above-described embodiment. However, a wireless communication device, a wireless communication system, a connection processing method, and a connection processing program according to the present disclosure are not limited to the above-described embodiment and various modifications and changes may be made to the embodiment without departing from the scope of the gist of the present disclosure. Also, if there is a plurality of embodiments and modified examples of the above-described embodiment, all or some of the embodiments and the modified examples may be combined to the extent that there is no contradiction.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A connection processing method executed by a communication system including a communication device and one or more other communication devices, the communication device having a first processor and a first storage device, the first processor being configured to execute a first program stored in the first storage device, the one or more other communication devices respectively having a second processor and a second storage device, the second processor being configured to execute a second program stored in the second storage device, the connection processing method comprising:
  executing the first program, by the first processor, so as to:
    store information including user specific information that specifies a user of the communication device and radio address information of the communication device in the first storage device;
    execute an inquiry for a connection to the one or more other communication devices so that the first processor is configured to send the inquiry to the one or more other communication devices;
    receive a response of the inquiry which includes at least a flag indicating presence or absence of the information in the one or more other communication devices and determine whether the flag has been set on to indicate the presence or set off to indicate the absence, the response including a first response and a second response,
    selecting a target communication device that has responded among the one or more other communication devices, the target communication device including a first target communication device and a second target communication device;

transmitting the information to the selected first target communication device upon receipt of the first response transmitted from the first target communication device, the first response including the flag indicating the absence of the information in the second storage device; and receive the second response transmitted from the second target communication device, the second response including the flag indicating the presence of the information in the second storage device and the radio address information, extract the radio address information from the second response, determine whether the extracted radio address information exists in the first storage device, and transmit the information to the second target communication device when the extracted radio address information exists in the first storage device;

executing the second program, by the second processor in the first target communication device, so as to:

receive the inquiry sent from the communication device;

transmit the first response to the communication device;

receive the information from the communication device and store the information in the second storage device; and execute a communication between the communication device and the first target communication device without executing user-authentication processing; and executing the second program, by the second processor in the second target communication device, so as to:

receive the inquiry sent from the communication device;

transmit the second response to the communication device;

receive the information from the communication device and determine whether the information transmitted from the communication device and the information stored in the second storage device match one another; and execute a communication between the communication device and the second target communication device without executing the user-authentication processing when the information transmitted from the communication device and the information stored in the second storage device match one another.

2. The connection processing method according to claim 1, wherein a processing executed by the first processor includes:

displaying common code information on respective screens of the communication device and the target communication device, and determining whether the displayed code information matches with predetermined code information for each of the communication device and the target communication device.

3. A communication system comprising:

a communication device having a first processor and a first storage device, the first processor being configured to execute a first program stored in the first storage device; and one or more other communication devices respectively having a second processor and a second storage device, the second processor being configured to execute a second program stored in the second storage device, wherein the first processor is configured to execute the first program so as to:

store information including user specific information that specifies a user of the communication device and radio address information of the communication device in the first storage device;

execute an inquiry for a connection to the one or more other communication devices so that the first processor is configured to send the inquiry to the one or more other communication devices;

receive a response of the inquiry which includes at least a flag indicating presence or absence of the information in the one or more other communication devices and determine whether the flag has been set on to indicate the presence or set off to indicate the absence, the response including a first response and a second response:

select a target communication device that has responded among the one or more other communication devices, the target communication device including a first target communication device and a second target communication device;

transmit the information to the selected first target communication device upon receipt of the first response transmitted from the first target communication device, the first response including the flag indicating the absence of the information in the second storage device; and receive the second response transmitted from the second target communication device, the second response including the flag indicating the presence of the information in the second storage device and the radio address information, extract the radio address information from the second response, determine whether the extracted radio address information exists in the first storage device, and transmit the information to the second target communication device when the extracted radio address information exists in the first storage device, wherein the second processor in the first target communication device is configured to execute the second program so as to:

receive the inquiry sent from the communication device;

transmit the first response to the communication device, receive the information from the communication device and store the information in the second storage device; and execute a communication between the communication device and the first target communication device without executing user-authentication processing, and wherein the second processor in the second target communication device is configured to execute the second program so as to:

receive the inquiry sent from the communication device;

transmit the second response to the communication device;

receive the information from the communication device and determines whether the information transmitted from the communication device and the information stored in the second storage device match one another, execute a communication between the communication device and the second target communication device without executing the user-authentication processing when the information transmitted from the communication device and the information stored in the second storage device match one another.

4. The communication system according to claim 3, wherein the first processor is configured to:
display common code information on respective screens of the communication device and the target communication device, and
determine whether the displayed code information matches with predetermined code information for each of the communication device and the target communication device.

5. A communication device comprising:
a memory configured to store a program; and
a processor coupled to the memory and configured to execute the program so as to:
store information including user specific information that specifies a user of the communication device and radio address information of the communication device in the memory;
execute an inquiry for a connection to one or more other communication devices so that the processor is configured to send the inquiry to the one or more other communication devices;
receive a response of the inquiry which includes at least a flag indicating presence or absence of the information in the one or more other communication devices and determine whether the flag has been set on to indicate the presence or set off to indicate the absence, the response including a first response and a second response;
select a target communication device that has responded among the one or more other communication devices, the target communication device including a first target communication device and a second target communication device;
transmit the information to the selected first target communication device upon receipt of the first response transmitted from the first target communication device, the first response including the flag indicating the absence of the information; and
receive the second response transmitted from the second target communication device, the second response including the flag indicating the presence of the information and the radio address information, extract the radio address information from the second response, determine whether the extracted radio address information exists in the memory, and transmit the information to the second target communication device when the extracted radio address information exists in the memory.

* * * * *